(12) United States Patent
Metivier

(10) Patent No.: US 8,774,714 B2
(45) Date of Patent: Jul. 8, 2014

(54) EXTERNAL POWER SUPPLY SYSTEM FOR A LOCK COMPRISING NFC-TYPE CONTACTLESS COMMUNICATION MEANS

(75) Inventor: Pascal Metivier, Feucherolles (FR)

(73) Assignee: Assa Abloy AB (SE)

( * ) Notice: Subject to any disclaimer, the term of this patent is extended or adjusted under 35 U.S.C. 154(b) by 246 days.

(21) Appl. No.: 13/266,950

(22) PCT Filed: Apr. 28, 2010

(86) PCT No.: PCT/FR2010/050806
§ 371 (c)(1),
(2), (4) Date: Jan. 9, 2012

(87) PCT Pub. No.: WO2010/125306
PCT Pub. Date: Nov. 4, 2010

(65) Prior Publication Data
US 2012/0108168 A1    May 3, 2012

(30) Foreign Application Priority Data

Apr. 30, 2009    (FR) ...................................... 09 52855

(51) Int. Cl.
*H04B 5/00*    (2006.01)
(52) U.S. Cl.
USPC ....... 455/41.1; 455/411; 455/556.1; 455/558; 455/572; 455/565; 340/5.7; 340/825.31; 235/488; 380/247
(58) Field of Classification Search
USPC ............... 455/41.1, 411, 558, 556.1, 572, 76, 455/565; 340/5.7, 825.31; 70/257, 143, 70/277; 235/488; 380/247
See application file for complete search history.

(56) References Cited

U.S. PATENT DOCUMENTS

| | | | | |
|---|---|---|---|---|
| 7,054,613 | B2 * | 5/2006 | Smeets | 455/410 |
| 7,375,616 | B2 * | 5/2008 | Rowse et al. | 340/10.1 |
| 8,037,511 | B1 * | 10/2011 | Lundy et al. | 726/3 |
| 8,432,293 | B2 * | 4/2013 | Symons | 340/854.8 |
| 8,482,377 | B2 * | 7/2013 | Finkenzeller | 340/5.1 |
| 8,482,378 | B2 * | 7/2013 | Sadighi et al. | 340/5.2 |

(Continued)

FOREIGN PATENT DOCUMENTS

FR      2 839 833      11/2003
KR    10 2008 0050089    6/2008

(Continued)

OTHER PUBLICATIONS

International Search Report for PCT/FR2010/050806, mailed Mar. 21, 2011.

(Continued)

*Primary Examiner* — Marceau Milord
(74) *Attorney, Agent, or Firm* — Sheridan Ross P.C.

(57) ABSTRACT

The invention relates to a system comprising: a lock (10) provided with electronic circuits for transmission/reception via NFC and electric circuits for controlling mechanical locking/unlocking members, and a mobile phone (16) provided with circuits allowing same to operate in NFC mode. In addition, means are provided for transmitting power to the lock by means of remote power feeding (18) from the phone, such as to charge a buffer capacitor in order subsequently to provide power temporarily to the electronic and electric circuits of the lock while the lock is querying the NFC circuits of the phone in order to check the authorization of the person with the phone and to order to opening of the door.

21 Claims, 1 Drawing Sheet

(56) References Cited

U.S. PATENT DOCUMENTS

| | | | |
|---|---|---|---|
| 8,538,332 B2 * | 9/2013 | Huomo et al. | 455/41.2 |
| 2009/0158423 A1 * | 6/2009 | Orlassino et al. | 726/19 |
| 2009/0264099 A1 * | 10/2009 | Csank | 455/411 |
| 2010/0274859 A1 * | 10/2010 | Bucuk | 709/206 |

FOREIGN PATENT DOCUMENTS

| | | |
|---|---|---|
| WO | WO 2006/077418 | 7/2006 |
| WO | WO 2007/126375 | 11/2007 |
| WO | WO 2009/094683 | 8/2009 |

OTHER PUBLICATIONS

French Search Report for FR Application No. 0952855, dated Jan. 20, 2010.

* cited by examiner

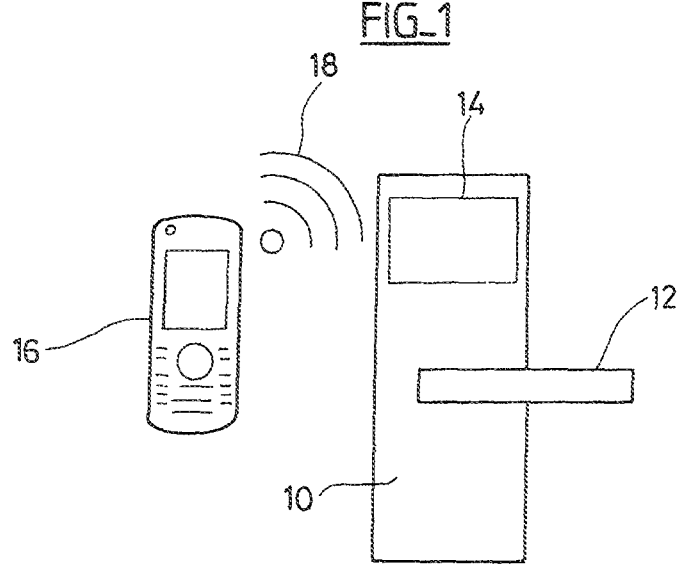
FIG_1
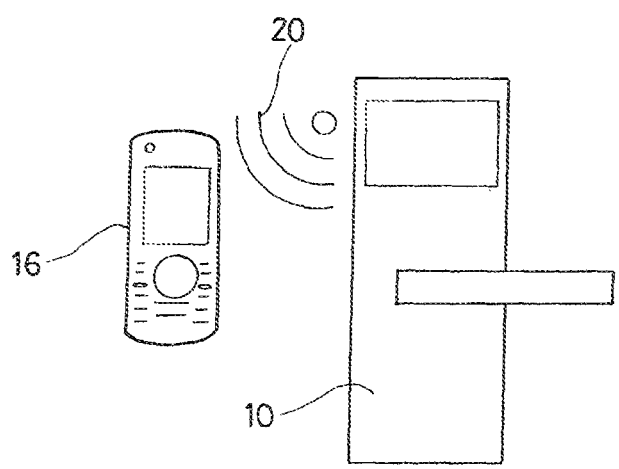
FIG_2

EXTERNAL POWER SUPPLY SYSTEM FOR A LOCK COMPRISING NFC-TYPE CONTACTLESS COMMUNICATION MEANS

This application is the U.S. national phase of International Application No. PCT/FR2010/05806, filed 28 Apr. 2010, which designated the U.S. and claims priority to FR Application No. 0952855, filed 30 Apr. 2009, the entire contents of each of which are hereby incorporated by reference.

The invention relates to locks controlled by means of a hand-held object acting as a key, which cooperates with the lock by way of a non-galvanic mutual coupling of the NFC (Near Field Communication) type.

More particularly, the hand-held object is a portable telephone equipped with a NFC chip and a NFC antenna, the SIM card being used as a security element.

For that purpose, the lock comprises an induction coil acting as an antenna, excited by an AC signal so as to produce in the surrounding space a variable magnetic field, able to be detected over a range of at most a few centimeters. Such field is sensed by the NFC antenna of the telephone, and the latter, in response, modulates a variable charge. Such variation, coded by various data coming from the telephone (identifier, encryption key, etc.), is then detected by the lock, which permits the desired bidirectional communication to be established. To perform these functions, the locks comprise electronic circuits for transmission/reception and numerical calculation, as well as electric circuits for the control of locking/unlocking mechanical elements.

In order to operate, these various circuits need to be supplied with electric power, and the lock comprises for that purpose a rechargeable or replaceable integrated battery.

A difficulty arises when this battery is discharged or if it offers only a too low charge for a standard operation: insofar as the lock can no longer supply power to the induction coil, it is no longer possible to establish a contactless communication with the outside and thus to recognize the portable telephone. On the other hand, the mechanical elements of the lock can no longer be controlled, and the lock thus remains locked.

A first solution consists in providing on the lock a backup power supply point, to which a specific backup battery can be temporarily connected from the outside to allow making up for the inner battery failure, the time for the door to be open and for the lock casing to be then taken down in order the change the battery.

The object of the present invention is to propose another solution for supplying power to the lock from the outside in case of inner battery failure, without using an electric connector and without requiring a specific external backup battery.

The principle of the invention consists in using the portable telephone as a power source for remotely supply power to the lock, i.e. for transmitting energy to it in a non-galvanic manner via the NFC circuits.

For that purpose, the mode of operation of the telephone is reversed:

normally, the lock is active, in a mode referred to as the "reading mode", and the telephone is passive, in a mode referred to as the "card emulation mode" (the telephone emulates the operation of a contactless chip card). The lock operates in NFC transmission mode in order to remotely power supply and interrogate the NFC circuits of the telephone; after the coupling has been established, the lock reads the identifier and/or the data stored in the telephone and authorizes or not the door opening.

in case of inner battery failure, the lock can no longer produce any magnetic field, for lack of sufficient energy. The telephone is then switched to the "reading mode", i.e. the NFC transmission mode: so, it is it that will transmit energy to the lock by remote power supply. This energy, taken from the battery of the telephone, will be sufficient to charge a buffer capacitor, so as to next temporarily power supply the circuits of the lock, during the time required for the latter to verify the authorization of the telephone user and to control the door opening.

BRIEF DESCRIPTION OF THE DRAWINGS

FIG. 1 depicts a telephone generating a magnetic field; and
FIG. 2 depicts a lock generating a magnetic field.

An exemplary embodiment of the invention is described with reference to FIGS. 1 and 2. In these figures, the reference number 10 designates the lock, which externally looks like a unitary element from which appears only a handle 12 and a target area 14 for the NFC communication, i.e. an area against which the hand-held object that acts as a key will have to be presented, wherein the object is in this case a portable telephone 16 provided with circuits enabling it to operate in NFC mode.

As an alternative, the device may consist of an electric cylinder capable of being integrated to a pre-existing lock, such cylinder comprising the various electric and electronic circuits required.

Normally, the lock 10 operates in a "reading mode" and the telephone 16 operates in a "card emulation mode". The lock produces an AC magnetic field that is detected by the telephone, and the latter, in response, modulates a charge; the resulting variation of the magnetic field is detected by the lock, which permits the coupling and the bidirectional communication with the telephone 16 to be established. The lock can then interrogate the telephone (according to known techniques), read the identifiers, codes, data, authorizations, etc., stored in the latter, verify these parameters and, if they match, control a motor for unlocking the mechanical elements of the lock.

In case of failure of the inner battery of the lock 10, the latter can no longer produce any magnetic field.

The absence of magnetic field, or a field of insufficient intensity, can be easily detected by the telephone when approaching the target area 14. In this case, the telephone is switched from the "card emulation mode" to the "reading mode". This situation is illustrated in FIG. 1: it is then the telephone 16 that generates a magnetic field, schematically shown at 18, toward the target area 14 of the lock 10.

This field, sensed by the lock, will be sufficient to charge a buffer capacitor provided inside the lock. On the screen of the telephone 16, a graphic indicator indicates to the user the quantity of power remaining to be sent to the lock so as to restore the operation thereof.

Once the required level of energy is obtained, the lock is switched back to the normal "reading mode". This situation is illustrated in FIG. 2. The lock 10 will then produce the magnetic field for interrogating the telephone, schematically shown at 20, and enter the normal process of verifying the data stored in the telephone 16, the latter having meanwhile been switched to its normal interrogation "card emulation mode".

In an alternative, the invention may be implemented with a lock having no supply battery. The same principles apply, with the only difference that the telephone is systematically Placed in the "reading mode" as soon as it is approached near the target area, without the need to detect whether a magnetic field is present or not, because the lock has no supply means of its own.

The invention claimed is:

1. A system comprising:
a lock provided with electronic circuits for NFC transmission/reception and with electric circuits for the control of locking/unlocking mechanical elements, and
a portable telephone provided with circuits enabling it to operate in NFC mode,
said system being characterized in that it comprises means for transmitting energy to the lock by remote power supply from the telephone, so as to charge a buffer capacitor in order to next temporarily power supply the electronic and electric circuits of the lock, during the time required for the latter to interrogate the NFC circuits of the telephone so as to verify an authorization of a telephone user and to control the door opening.

2. The system according to claim 1, comprising means for switching from a first configuration, in which the lock is in a mode referred to as the "reading mode" and the telephone is in a mode referred to as the "card emulation mode", to a second configuration, in which the telephone is switched to the "reading mode", so as to transmit energy to the lock by remote power supply in order to charge said buffer capacitor.

3. The system according to claim 2, comprising means for switching the lock back to the "reading mode" once the required level of energy is obtained and for meanwhile switching the telephone to the "card emulation mode", so as to permit the lock to then enter a process of verifying the data stored in the telephone.

4. The system according to claim 1, in which the lock has no supply battery, and the system comprises means for placing systematically the telephone in the "reading mode" when approaching a target area of the lock.

5. The system according to claim 1, wherein the lock comprises a lock cylinder with the electric circuits contained therein.

6. The system according to claim 1, wherein the portable telephone comprises a graphic indicator that indicates to the telephone user a quantity of power remaining to be sent to the lock so as to restore the operation thereof.

7. The system according to claim 1, wherein the portable telephone is configured to detect that the electronic circuits of the lock are at least one of (i) failing to produce a magnetic field and (ii) producing an insufficient magnetic field to power circuits of the portable telephone.

8. The system according to claim 7, wherein the portable telephone is further configured to switch itself from a "card emulation mode" to a "reading mode" in response to detecting that the electronic circuits of the lock are at least one of (i) failing to produce a magnetic field and (ii) producing an insufficient magnetic field to power circuits of the portable telephone.

9. The system according to claim 1, wherein the portable telephone is further configured to switch itself back to the "card emulation mode" in response to detecting that the lock is producing a magnetic field sufficient for interrogating the portable telephone.

10. The system according to claim 1, wherein the lock verifies the authorization of the telephone user by reading at least one of identifiers, codes, data, and authorizations received from the portable telephone.

11. The system according to claim 10, wherein the electric circuits of the lock control a motor for unlocking mechanical elements of the lock.

12. A lock, comprising:
an induction coil acting as an antenna, excitable by an Alternating Current (AC) signal so as to produce in a space surrounding the lock a variable magnetic field enabling communications with a portable communication device;
electronic circuits configured to enable the lock to transmit and receive communications via the antenna with the portable communication device;
one or more mechanical elements configured to be locked or unlocked based on information received from the portable communication device;
electric circuits configured to control movement of the one or more mechanical elements; and
a buffer capacitor configured to be charged by inductive coupling between the lock and the portable communication device and then discharged to temporarily supply power to both the electronic circuits of the lock as well as the electric circuits of the lock, thereby enabling the lock to communicate with the portable communication device as well as control the one or more mechanical elements.

13. The lock according to claim 12, further comprising an internal power source.

14. The lock according to claim 13, wherein the buffer capacitor is only charged when the internal power source is insufficient to supply power to both the electronic circuits of the lock as well as the electric circuits of the lock.

15. The lock according to claim 12, wherein the lock is configured to sense a field generated by the portable communication device.

16. The lock according to claim 12, wherein the lock switches from a "reading mode" to a "card emulation mode" while the buffer capacitor is being charged and then switches back to the "reading mode."

17. The lock according to claim 16, wherein the lock switches back to the "reading mode" after it has been charged so that the lock can interrogate the portable communication device.

18. The lock according to claim 12, wherein the lock uses energy discharged from the buffer capacitor to verify data provided to the lock by the portable communication device.

19. The lock according to claim 18, wherein the lock verifies at least one of identifiers, codes, data, and authorizations provided to the lock by the portable communication device with energy discharged from the buffer capacitor.

20. The lock according to claim 19, wherein the lock also controls a motor for unlocking the one or more mechanical elements with energy discharged from the buffer capacitor.

21. The lock according to claim 12, wherein the lock comprises no internal power source of its own.

* * * * *